Dec. 25, 1956   E. WEISS   2,775,402
CODED DECIMAL SUMMER
Filed May 25, 1951   7 Sheets-Sheet 1

INVENTOR.
ERIC WEISS
BY
Falwider and Mattingly
ATTORNEYS

Dec. 25, 1956  E. WEISS  2,775,402
CODED DECIMAL SUMMER
Filed May 25, 1951  7 Sheets-Sheet 2

INVENTOR.
ERIC WEISS

Dec. 25, 1956 E. WEISS 2,775,402
CODED DECIMAL SUMMER
Filed May 25, 1951 7 Sheets-Sheet 3

INVENTOR.
ERIC WEISS
BY
Fulwider and Mattingly
ATTORNEYS

Dec. 25, 1956  E. WEISS  2,775,402
CODED DECIMAL SUMMER
Filed May 25, 1951  7 Sheets-Sheet 4

Fig. 10

INVENTOR.
ERIC WEISS
BY
Falwider and Mattingly
ATTORNEYS

Dec. 25, 1956    E. WEISS    2,775,402
CODED DECIMAL SUMMER
Filed May 25, 1951    7 Sheets-Sheet 5

INVENTOR.
ERIC WEISS
BY
Fulwider and Mattingly
ATTORNEYS

Dec. 25, 1956  E. WEISS  2,775,402
CODED DECIMAL SUMMER
Filed May 25, 1951  7 Sheets-Sheet 6

Fig. 14

$$A_3 = [F_1F_2S_2S_3'(S_aS_\ell+S_aS_1+S_\ell S_1)+F_1'F_2'S_3'(S_aS_\ell+S_aS_2+S_\ell S_2)+F_1F_2'(S_aS_3'+S_2S_3')]C$$

Fig. 15

$$_0A_3 = [F_1'F_2'S_3(S_aS_\ell+S_aS_2+S_\ell S_2)+F_1F_2'S_3(S_1+S_2)+S_3F_1'F_2]C$$

Fig. 16

$$A_4 = \{F_1'F_2'S_3(S_aS_\ell+S_aS_2+S_\ell S_2)+F_1F_2'[(S_1S_3+S_2S_3+S_4)(S_aS_\ell+S_a'S_\ell')+S_4(S_1'S_2'+S_3')(S_aS_\ell'+S_a'S_\ell)]\}C$$

Fig. 17

$$_0A_4 = [F_1S_4(S_aS_\ell'+S_a'S_\ell)+F_1F_2]C$$

INVENTOR.
ERIC WEISS
BY
Fulwider and Mattingly
ATTORNEYS

Dec. 25, 1956

E. WEISS 2,775,402

CODED DECIMAL SUMMER

Filed May 25, 1951

INVENTOR.
ERIC WEISS
BY
Fulwider and Mattingly
ATTORNEYS

United States Patent Office 2,775,402
Patented Dec. 25, 1956

2,775,402

CODED DECIMAL SUMMER

Eric Weiss, Los Angeles, Calif.

Application May 25, 1951, Serial No. 228,235

12 Claims. (Cl. 235—61)

The present invention relates to electronic digital adding circuits and more particularly to a novel adding means and method for operating on numbers expressed by a coded decimal system.

It is well known that digital computers can be devised using bistable state devices, such as flip-flops, for manipulating binary representations of numbers. Because of the simplicity of the binary numbers, i. e., either a 1 or a 0, the means for operating on the digits is comparatively less complex than for other number systems.

Digital adding circuits, which comprise the main components of most of these computing machines, have heretofore been known for summing numbers expressed in the straight binary notation. However, the binary number system is not commonly understood and is not considered practical for operators reading into and out of the machine, and so binary coded decimal systems for manifesting decimal numbers have been devised. For example, a decimal digit may be represented in these systems by a block of four binary digits. By noting the absence or presence of binary digit "ones" in each of the four digit positions within this block, the magnitude of the decimal digit is determined.

It is accordingly an object of this invention to provide an electronic means and method for receiving two numbers represented in a coded decimal system and emitting their sum represented in the same coded decimal system.

It is another object of this invention to provide a novel electronic means and method for summing two coded decimal numbers using a storage means that can be efficiently used for storing different types of information as needed during the operation.

It is another object of this invention to provide a novel electronic means and method for summing two coded numbers having a minimum delay between the inputs and the outputs.

It is still another object of this invention to provide a novel counting circuitry which can record a binary count by increasing its content from any given value in accordance with the weight given to a pair of incoming digits by a given code.

It is still another object of this invention to provide a novel binary coded system for representing decimal numbers which can be operated upon with all the features of advantage usually associated with straight binary number systems.

Briefly, the summing circuit of the present invention is comprised of bistable state devices, such as flip-flop circuits, and an associated control network. The two waveform patterns representing the numbers to be summed are serially fed into the control network which has a cycling action controlled by clock pulse inputs fed in from another source. The single output waveform pattern from the summer represents the number corresponding to the sum of the input pulse numbers and is indicated by the same code used for expressing the inputs.

The control network for the flip-flops operates according to a set of logical equations. Each of the equations defines when and how a flip-flop will change its state. The outputs of the flip-flops, together with the input waveforms, represent the terms of the equations which are combined by logical multiplication or logical addition operations. These operations are physically performed by networks comprising arrangements of diodes and resistors which interconnect the lines carrying the voltages representative of the terms. The clock pulses are used for synchronizing and beating the summing circuit. Whenever, as the result of a clock pulse actuation, the terms of the network are made proper to satisfy a control input to a flip-flop, the logical multiplication of this control input with the next clock pulse causes the flip-flop to change, unless it is already in the state controlled by the input, in which event it remains in that state.

The cycling action of the summer circuit corresponds to the receipt of four successive binary digits which define a decimal block. An auxiliary set of flip-flops is arranged to successively count clock pulses and emit potentials representative of the four cycle counts.

Thus, it can be stated that the electrical status of the logical network, and consequently the flip-flops themselves, change in response to voltages (terms) representing: digit inputs, the states of the flip-flops following the previous clock pulse actuation, and the step of the cycle through which the summer advances.

The invention will be more clearly understood by the following detailed description of a preferred form of the invention taken together with the accompanying drawings forming a part of this specification in which.

Figure 1:
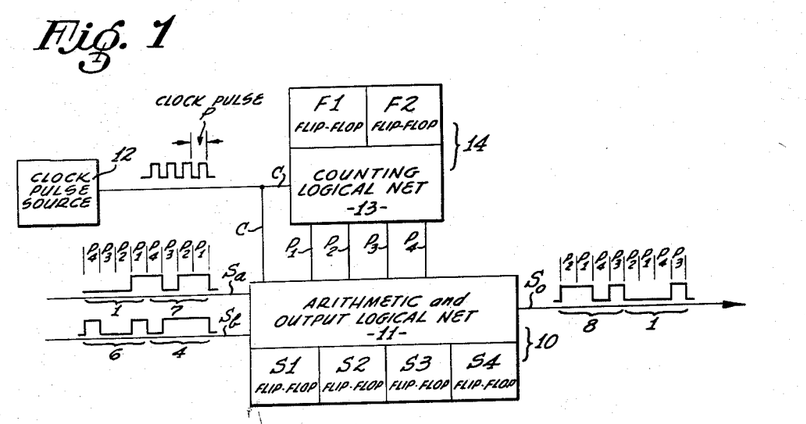
Figure 1 is a schematic block diagram showing generally the arrangement of the preferred embodiment of the summer circuit.

Referring first to Figure 1, a block diagram shows the general arrangement of the present invention. The summer 10 is comprised of flip-flops S1, S2, S3, and S4 together with an arithmetical and output logical net 11. The potential waveforms appearing on inputs $S_a$ and $S_b$ represent coded decimal numbers which are to be added in the summer 10. The waveform appearing on output $S_0$ represents the sum of the inputs.

A clock pulse source 12 continuously emits square waves which determine the clock periods P. A clock period is the interval between the trailing edge of one clock pulse and the trailing edge of the succeeding clock pulse. These clock periods are used for determining the time allocated to a binary digit which is manifested, for example, by the potential output from a flip-flop. A high potential output from, say, the right plate connection of a flip-flop during a clock period manifests the binary digit "one," and a low potential output therefrom manifests the binary digit "zero."

Since a decimal digit is represented in the present invention by a group or block of four binary digits, the presence of a high potential on inputs $S_a$ or $S_b$ during each of four consecutive clock pulse periods must be observed. Pulse time counter 14, counting clock pulses from clock source 12, keeps track of the particular binary digits in a decimal block. This is accomplished by outputs from the counting logical net 13 which together with flip-flops F1 and F2 constitute the counter 14. The outputs from counter 14 emit potentials manifesting counts $P_1$, $P_2$, $P_3$, $P_4$, $P_1$, $P_2$, $P_3$, $P_4$ etc. in a cyclical manner. The count potential which is high during a given clock period indicates which particular binary digit of a decimal block is being observed at the input of summer 10.

Figure 2:
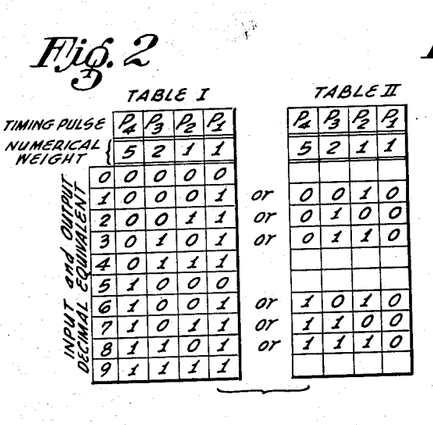
Figure 2 is a binary table showing the four place code representing each of the decimal digits.

Table I of Figure 2 shows the binary code used for representing the decimal digits. The timing pulses $P_1$, $P_2$, $P_3$, and $P_4$, together with the numerical weight associated with these pulse times, 1, 1, 2, 5, respectively, define the columns of the table. The decimal equivalent of the binary code in each row is thus obtained in the table by totaling up the effective components of the decimal digit as indicated by the binary one in the appropriate columns. It should be noted that the decimal digit equivalents 1, 2, 3, 6, 7, and 8, can be represented by two different code combinations. The code presented in Table II of Figure 2 is obtained as the result of inverting a waveform to obtain a code of the complement as desired when performing a subtraction. As will be brought out in the ensuing description, whether the magnitude of an input decimal digit is represented by either code combination, the summing circuit will be able to operate correctly. However, it should be understood that the output decimal digit is always represented by the code in Table I.

Referring back to Figure 1, it will now be broadly described how the summer 10 operates to add the coded decimal number 17 appearing on input $S_a$, to the coded decimal number 64 appearing simultaneously on input $S_b$.

In Table I of Figure 2, the decimal digit 7 is defined by a binary digit "one" in pulse positions $P_1$, $P_2$ and $P_4$, while pulse position $P_3$ is "zero." Thus in Figure 1, a high potential is impressed on input $S_a$ during the $P_1$ and $P_2$ periods; this potential then drops to a lower value during the $P_3$ period and then rises again for the $P_4$ period. The decimal digit 1 which immediately follows the decimal digit 7, in time, on input $S_a$, is shown by Table I to consist of a binary digit "one" for the $P_1$ pulse period followed by the binary digit "zero" in $P_2$, $P_3$ and $P_4$ pulse periods. Hence, a high potential exists for the $P_1$ period and drops to a low potential for the remaining duration of the block. In a similar manner the decimal number 64 is recognized on input $S_b$.

The input binary digits in each block are serially fed into the summer 10 in the same order in which the count potentials $P_1$, $P_2$, $P_3$ and $P_4$ are energized. These count potentials synchronize and program the nature of the summer 10 so that it gives each coded binary input digit its proper weight, and emits the sum coded binary digits in order at the proper pulse times. The sum waveform $S_0$ is shown to be represented by the waveform manifestation of the decimal number 81. As indicated in Figure 1, the output waveform $S_0$ is shifted by two pulse periods in that a decimal block, when referred to the input timing pulse counts, is now recognized to be $P_3P_4P_1P_2$. This is because there is an inherent two clock pulse period delay with which the corresponding sum coded digits are emitted from the summer 10.

Before going into a description of the details of the circuitry, the convention employed for presenting the system of thought of the present invention will be explained.

Logical propositions may be considered to be represented in the circuits by flip-flops which are electronic devices having two and only two possible steady state conditions. One of these conditions is referred to as "true" (in tables sometimes represented as "1") and, the other condition is referred to as "false" (in tables as "0").

The true and false conditions of a proposition are preferably referred to as terms which are represented throughout the circuits by a D. C. voltage at a point. This voltage can exist at either of two D. C. levels. When a term is effective, the voltage is high ($E_h$) and when the term is ineffective, the voltage is low ($E_l$). (See Figure 5.)

Thus by connecting output lines, for example, to each of the plates of the tubes in a flip-flop circuit, the output line having a high potential determines the effective state (or term) of the flip-flop. The other output line, having necessarily a low potential, then represents the ineffective state.

In accordance with the present scheme it is desirable to be able to trigger a proposition flip-flop to either its true or false state by signals applied on separate inputs. Hence an input line is coupled to the grid of each of the tubes of the flip-flops.

The nomenclature used for the present invention employs combinations of capital letters and numbers for designating the proposition flip-flops themselves. The outputs of the flip-flops are characterized by corresponding capital letters with an appropriate subscript. In order to characterize the true state output of a flip-flop from the false, the latter is distinguished from the former by an affixed prime.

On the other hand, the inputs to a flip-flop are designated by corresponding lower case letters with an appropriate subscript. The input for rendering a flip-flop false is further characterized by a subscript zero prefixing the lower case letter.

Figure 3:
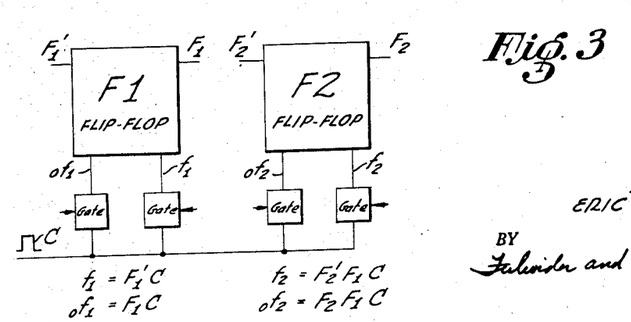
Figure 3 is a block diagram of the cycle counter together with the logical equations defining the triggering inputs for each of the flip-flop stages.

Referring next to Figure 3, the flip-flop F1 and F2 comprising the stages of the F counter are schematically illustrated.

In accordance with the present invention, the outputs of the flip-flops are connected to the inputs to cause the F counter to count through a cycle of four consecutive counts, namely: $P_1$, $P_2$, $P_3$ and $P_4$.

The counter arrangement is a parallel one in that a C pulse from the clock pulse source 12 is applied on all flip-flop inputs simultaneously. The interconnections of the flip-flop outputs, however, allow only certain flip-flops to be triggered by the successive C pulses so as to change their states in an orderly fashion to indicate the cycle counts.

Figure 4:
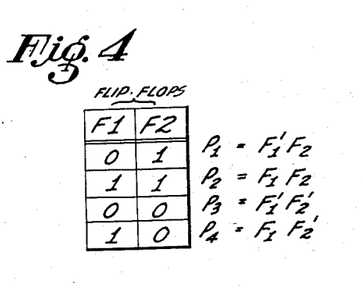
Figure 4 is a binary table showing the states of the F flip-flops characteristic of the cycle count.

In Figure 4, the combinations of the states of the flip-flops which indicate the digital content of the counter are shown by a table. This table is a binary representation of the pulse counts $P_1$ through $P_4$.

On examining the states of the F flip-flops, when desiring to make the F1 flip-flop true, i. e., have a 1 therein on occurrence of the next C pulse, it is noted that the F1 flip-flop must have a 0 therein, i. e., be in a false state. Similarly the F1 flip-flop must be in a true state in order to be switched to a false state on the next C pulse.

It is thus noted that the F1 flip-flop changes its state every time a clock pulse is fed therein.

Figure 5:
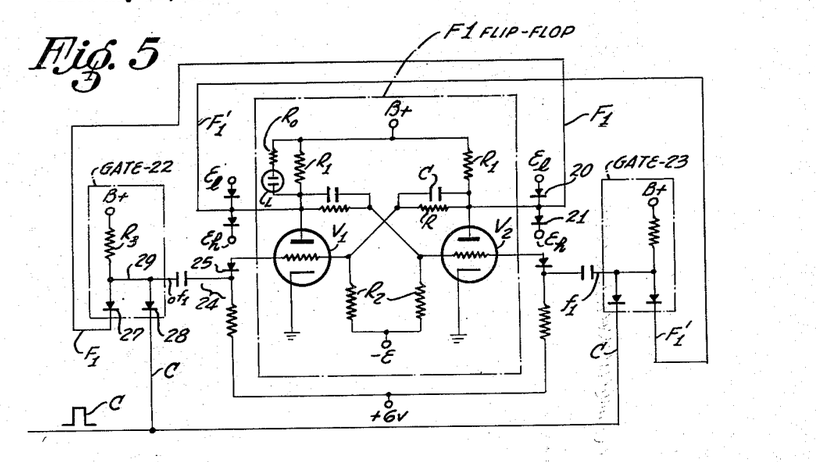
Figure 5 is a detailed circuit diagram of the F1 flip-flop in the cycle counter.

Referring next to Figure 5 a detailed schematic circuit diagram is shown of how the F1 flip-flop is connected so as to operate as the first stage of the F counter.

The flip-flop circuit as used in the present invention is well known in that it is comprised of two triodes, V₁ and V₂, having opposite plates and grids intercoupled by a resistor R in parallel with a capacitor C. The plate of each of the triodes is connected through a separate load resistor, like resistor R₁, to a positive D. C. source B+, and the cathode of each triode is grounded. Each of the grids of the tubes is joined through a separate grid resistor R₂ to a negative bias —E. The flip-flop circuit is provided with triggering circuits associated with each of its grids and output circuits connected to each of its plates.

Whenever the flip-flop is considered to be in a "one" state, neon light L, connected in series with a limiting resistor R₀ across the left load resistor R₁, lights up; and when the flip-flop is in a "zero" state, neon light L is out.

The output lines F₁ and F₁' from the F1 flip-flop are taken from the right and left plates respectively. In order to maintain the swing of the plate voltage between voltage levels E_h and E_l, clamping diodes, such as diodes 20 and 21 associated with the right output F₁, are provided on each of the output lines.

The inputs to the flip-flop are controlled by gate circuits 22 and 23 associated with the grids of the V₁ and V₂ tubes, respectively. Each of the gates is coupled through a differentiating circuit 24 and blocking diode 25 as shown in particular for the left grid, the grid of tube V₁.

For this particular counting stage, the right plate output F₁ is connected to one input of the left gate 22, and the left plate output F₁' is connected to one input of the right gate circuit 23. The clock pulse C is applied simultaneously to the second inputs of each of the left and right gate circuits 22 and 23.

These gate circuits 22 and 23 are typical logical product diode nets. In such a circuit, as noted in particular for left gate 22, the inputs therein are applied on the cathode-ends of crystal diodes 27 and 28 whose anode-ends are joined to a common line 29 which is connected to a positive source B+ through a load resistor R₃.

Any time the plate input to the gate circuit is high in potential, the clock pulse C applied to the other input is, in effect, passed to the output. This pulse is differentiated in differentiating circuit 24 and the positive portion thereof is blocked by diode 25 while the negative portion is passed therethrough and thus triggers the V₁ tube off.

Figure 6:
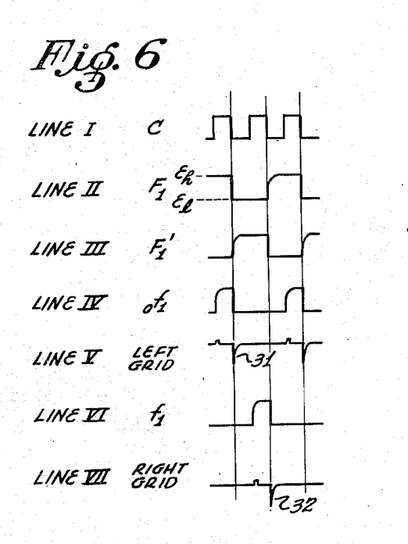
Figure 6 is a graph of the voltage waveforms which are referred to in explaining the operation of the F1 flip-flop.

In Figure 6 the graphs of the waveforms appearing at different points of the F1 counting stage circuit, above described, are shown. In line I the regularly recurring clock pulses C are shown; in line II the F₁ plate output is shown to be initially of a high voltage (E_h); while in line III the F₁' plate output is shown to be initially of a low voltage (E_l). As shown in line IV, whenever both the waveforms F₁ and C are relatively high in potential, the term $_0f_1$ is considered to pass through the gating circuit 22 as a rectangular pulse similar in waveform to the clock pulse C. The clock pulse source is of very low impedance so as to ensure that the trailing edge of the wave is not rounded but relatively square. On line V, the pulse form impressed on the input to the left grid is shown to be essentially the differentiated trailing edge 31 of the rectangular pulse $_0f_1$. It is thus noted that the F1 flip-flop changes state on the trailing edge of the $_0f_1$ pulse (clock pulse C). It is also noted that as a result of triggering the left tube V₁ off, the left plate output F₁' rises in potential according to the time constant of the flip-flop circuit. The output F₁' is now high in potential so that on occurrence of the next clock pulse C, the right gate 23, in effect, allows the clock pulse C to pass therethrough and hence the differentiated trailing edge 32 of this latter pulse triggers the F1 flip-flop back to its original state.

It is now evident that the clock pulse period divides the timing of the circuit operations into three distinct steps. During the first part of a clock pulse period, when the voltage from the clock source is low, the transients of the circuitry are occurring. For reliability, these should be completed before the leading edge of the clock pulse arrives. During the time of the clock pulse the logical net circuits can be thought of as observing the flip-flops and the other sources of inputs so as to know if a pulse should pass onto the grid of any of the flip-flops. The clock pulse must be broad enough so that, taking into account its rise time, it reaches its maximum voltage level before the end of the clock period. The clock pulse must also have a low impedance source, so that a square edge can be created on the trailing end of the pulse passing through the grid gates. These conditions make it possible to create by differentiation, a negative pulse, coincident with the end of the clock period, which can be used for triggering the flip-flops.

Figure 7:
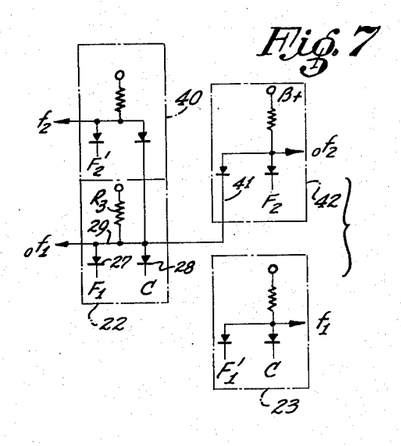
Figure 7 is a schematic circuit diagram of the counting logical net for the cycle counter.

Referring next to Figures 3 and 7 the simplified manner in which the remaining circuitry of the present invention is to be presented will now be described.

Instead of showing the wiring diagrams of the flip-flops together with the logical circuits, as in Figure 5, the remaining circuits present simplified block diagrams of the flip-flops. It should be understood however, that all the flip-flop circuits are identical. As shown in Figure 3, only the input and output lines for the flip-flop are indicated and these are marked in accordance with the convention previously described. Furthermore, the grid input differentiating and blocking circuits are omitted in the block diagrams for simplicity. Only the gates, indicating the logical product of the control input and clock input, are shown at each of the inputs so as to emphasize the fact that the clock pulses are applied simultaneously to all the flip-flop inputs.

In accordance with the scheme of the present invention, after the system of thought to be accomplished is explained by means of binary tables or similar means for systematizing the thought, the terms of the system are represented by the conditions of flip-flop circuits, or other sources of potentials having two possible levels.

Logical equations are then written which define when and how the flip-flop circuits are to change in accordance with the effective terms of the system. The logical equations, so devised, are then presented below the block diagram of the flip-flops.

Writing the logical equations for the grid triggering of a flipflop circuit is no more than stating the terms which have to be simultaneously of a high potential in order that the particular flip-flop should trigger into the particular state. Two distinct notations are used for the equations. The first, "logical multiplication" means that all the terms in the particular product have to be of high potential in order to make that product effective in a particular equation. The second, "logical addition" means that at least one term of the sum has to be of high potential in order to make that sum effective in a particular equation.

Thus, for example, the equation $$_0s_3 = S_3(S_1+S_2)CP_4$$

means that the S₃ flip-flop will change to the "false" state after the following four terms are at a high potential: S₃, (S₁+S₂), C, P₄ where the term (S₁+S₂), itself, will be of high potential if either S₁ is of high potential, or S₂, or both.

The particular representation of these logical equations has been chosen because these equations can be operated upon according to certain well known rules in a similar manner as algebraic equations are operated upon.

Having once described the means for physically generating a typical logical product and logical sum, the present techniques enable the logical circuitry for solving the entire logical equations to be set up directly by reference to the equations alone. The logical circuitry generally ends up as one large interconnected net made up of the two fundamental circuits. In reducing the equations to physical circuitry, recognition is made of the fact that certain common complex terms and partial products can be generated separately and used repeatedly where needed. This results in a reduction of the number of components required but often at the expense of complicating the recognition of the original equations. The present techniques, however, make it possible to retain in the equations the original system of thought, even though the equations go through several revisions, as long as the revisions are according to the well known rules of symbolic logic.

It should be noted that circuits to solve "logical multiplication" are also called "gates," and circuits to solve "logical addition" are also called "mixers."

Returning back to Figure 3, the conditions required for flipping the F1 flip-flop, as previously described in connection with Figure 5, are represented by symbolic logic equations $f_1 = F_1'C$ and $of_1 = F_1C$.

By examining the states of the F flip-flops, as presented in Figure 4, the symbolic logic equations for the F2 flip-flop can be similarly determined. The conditions necessary to make flip-flop F2 trigger to a true state, i. e., change from a 0 to a 1 state, are that flip-flop F1 be in a true state and flip-flop F2, itself, be in a false state; this can be symbolically noted by $f_2 = F_2'F_1C$. In a similar manner, the conditions required to make the flip-flop F2 false are that flip-flop F2 be true and flip-flop F1 be true, i. e. $of_2 = F_2F_1C$.

The logical diode nets used for physically solving all the triggering equations for the F counter are next introduced in Figure 7.

The nets for the equations $of_1 = F_1C$ and $f_1 = F_1'C$ for the F1 flip-flop are the gate circuits 22 and 23, respectively, shown in Figure 5. Here they are simply shown by designating the inputs to the gate 22, known as the typical two input product gate, by terms of the $of_1$ equation; and by designating the inputs to the product gate 23 by terms of the $f_1$ equation. The outputs of these gates are marked respectively $of_1$ and $f_1$. Each of these product circuits is such that whenever any of the inputs are of relatively low potential, the output is also of relatively low potential; however, when all the inputs are of relatively high potential, the output is also of relatively high potential. In other words, the output potential equals the lowest input potential.

The equation for gate $f_2$ is seen, in Figure 3, to be a product of the same two terms defining $of_1$ multiplied by an additional term $F_2'$. It should be noted in Figure 7 that instead of providing a three input product circuit for solving the $f_2$ equation, the output of the two input product circuit 22 is cascaded into a second two input product circuit 40 along with the new term $F_2'$. Thus the output $f_2$ of the second two input product circuit 40 generates the $f_2$ solution.

The equation $of_2$ also includes the common product defining $of_1$. Hence the outputs of the two input product circuit 22 is also fed as one of the inputs 41 into a third two input product circuit 42 along with the new term $F_2$. The output of this third product circuit 42 provides $of_2$.

The above circuits illustrate clearly how the equations for the input to the proposition flip-flops operate as a key, revealing the manner in which the outputs of the flip-flops are logically interconnected to the inputs, i. e., they define how and when the flip-flops should change with respect to the conditions of other propositions in the circuits.

The equation representing the timing pulses $P_1$, $P_2$, $P_3$ and $P_4$ are seen in Figure 4 to be composed of logical products of the terms represented by the outputs from the F flip-flops. These products are physically generated by the networks shown in Figure 10. Here it is shown that $P_1 = F_1'F_2$ is manifested on line 44, $P_2 = F_1F_2$ on line 65, $P_3 = F_1F_2'$ on line 66 and $P_4 = F_1F_2'$ on line 67.

Returning again to Figure 1, the summer circuit 10 will now be described in detail.

The summer flip-flops fundamentally function as a straight binary counter, that is, the S1 flip-flop represents the $2^0$ stage, and the S2, S3, and S4 flip-flops represent the $2^1$, $2^2$ and $2^3$ stages, respectively, of the counter.

However, although the S counter flip-flops manifest a binary count, the binary digit 1 inputs to the S counter do not always represent unit weight, but, depending on the cycle pulse time, may also be weighted either two or five units. Another feature of the S counter is that it must be able to handle inputs from two sources $S_a$ and $S_b$. Still another feature of the counter is that there must be complete generality in counting so that the counter can increase its count from any given count, within certain defined limits, in accordance with the weight of the inputs received.

Figures 8, 9:
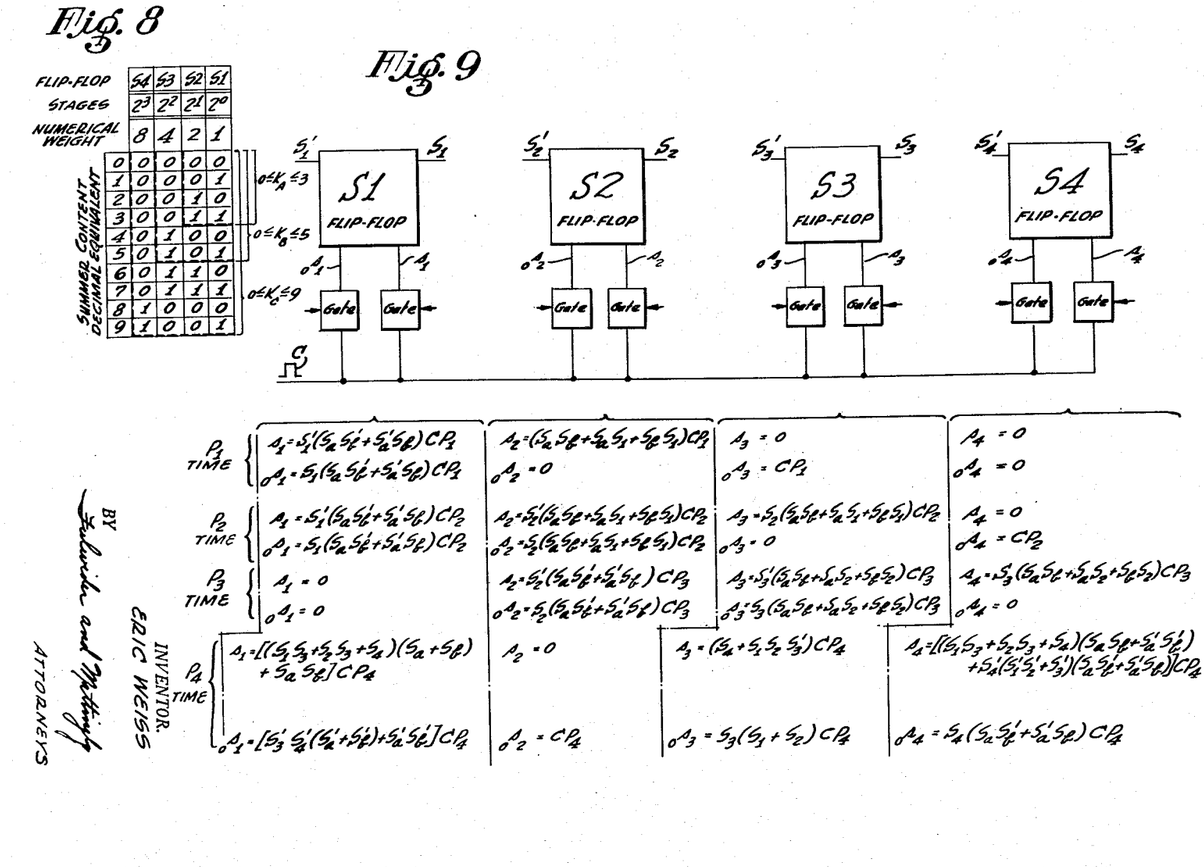
Figure 8 is a binary table showing the decimal equivalent of the binary contents of the flip-flops comprising the summer.
Figure 9 is a block diagram of the summer flip-flops together with the symbolic equations defining the grid triggering inputs.

Referring next to Figure 9, the schematic block diagrams of the S1, S2, S3, and S4 flip-flops are shown together with the trigger logical equations associated with each of the grid inputs.

During the $P_1$ and $P_2$ pulse times (Figure 2), the effective external inputs (high potentials) received on $S_a$ and $S_b$ are given unit weight in the S counter, that is, the counter flip-flops function as a "unit" counter.

It should be noted that the range of $K_A$, the content of the counter for $P_1$ time, is $0 \leqslant K_A \leqslant 3$. That is to say, any number of unit inputs from 0 to 3 may be received. It is when a unit "carry" is received from a previous addition, simultaneously with a unit input on $S_a$ and $S_b$, that the counter can record a content of 3.

Referring to Figure 8, a binary table shows the states of the S flip-flops equivalent to the decimal counts. The S flip-flops are here noted to indicate a binary count in a conventional manner. The range $K_A$ of the counter is seen to include flip-flops S1 and S2 so that as far as counting is concerned only these flip-flops need be taken into account during $P_1$ time.

On this basis, the equations for the S1 flip-flop during $P_1$ time are determined to be as follows:

$$s_1 = S_1'(S_aS_b' + S_a'S_b)CP_1$$
$$os_1 = S_1(S_aS_b' + S_a'S_b)CP_1$$

These equations, in effect, indicate that if a unit is fed into the counter from either of the two external inputs $S_a$ or $S_b$, but not both; if the S1 flip-flop is in the 0 state it will flip to the 1 state, and if it is in the 1 state it will flip to the 0 state. This mode of operation is in accord with the binary counting table shown in Figure 8 which indicates that as unit inputs are added to the counter, the S1 flip-flop records the change by flipping to the opposite state from which it was in before the unit input.

Since, as indicated, the maximum count (decimal) which can be stored in the counter during $P_1$ time is 3, it is possible that the S2 flip-flop may be triggered to a 1 state but never to a 0 state. Thus the input equations to the S2 flip-flop need only be written for $s_2$, the input which renders the S2 flip-flop true, the other input being necessarily equal to zero, thus:

$$s_2 = (S_aS_b + S_aS_1 + S_bS_1)CP_1$$
$$os_2 = 0$$

Equation $s_2$ indicates that whenever a count of at least two inputs is indicated during the $P_1$ time, whether by units on each of the external inputs or a unit on one of the external inputs and a "one" content already in the S1 flip-flop, the S2 flip-flop records a "one" on the next clock pulse.

It is to be noted by equation $os_3 = CP_1$, that the S3 flip-flop is set false at the end of the $P_1$ pulse time. The reason for this is that during $P_1$ time the weight 2 component, stored (at the end of $P_4$ time) as a result of the previous coded decimal sum cycle, is read out of the S3 flip-flop. As will be made more evident in the ensuing discussion the S3 flip-flop was used for storing a coded binary output digit during the $P_1$ time. Clearing the S3 flip-flop makes it possible to again utilize this flip-flop as a counting stage as required during $P_2$ and $P_3$ times.

This is brought out by the table in Figure 8 which shows that during the $P_2$ pulse time, the total count of the units, $K_B$, has the range $0 \leq K_B \leq 5$. Note that during $P_1$ time the maximum count may be 3 and by adding a unit on each of the external inputs during the $P_2$ time, this total may be as great as 5. Thus it requires flip-flops S1, S2, and S3 to store the magnitude $K_B$ and hence equations must be written for all these flip-flop grid inputs.

The equations for the S1 flip-flop during the $P_2$ pulse time are:

$$s_1 = S_1'(S_aS_b' + S_a'S_b)CP_2$$
$$os_1 = S_1(S_aS_b' + S_a'S_b)CP_2$$

These equations are identical to the S1 flip-flop equations for the $P_1$ pulse time in that they provide for increasing the content of the counter by one unit when only one of the external inputs, $S_a$ or $S_b$, indicates a one.

As for the S2 flip-flop, during the $P_2$ pulse time, the inputs are as follows:

$$s_2 = S_2'(S_aS_b + S_aS_1 + S_bS_1)CP_2$$
$$os_2 = S_2(S_aS_b + S_aS_1 + S_bS_1)CP_2$$

Note that the true grid input equation $s_2$ functions the same as for the $P_1$ time. The $os_2$ equation is herein introduced to change flip-flop S2 to a zero or false state as is needed when the units received, plus the previous contents of the counter, total 4 (or 5). As seen in Figure 8, the count 4 (or 5) is evidenced by a zero in the S2 flip-flop.

In order to record a 4 (or 5) in the counter during $P_1$ time, by the same reasoning which is used for setting flip-flop S2 false, the S3 flip-flop must be set true. Thus:

$$s_3 = S_2(S_aS_b + S_aS_1 + S_bS_1)CP_2$$
$$os_3 = 0$$

The reason the $os_3$ equation is set equal to zero is because the maximum count which can be stored in the counter during $P_2$ time is 5, and, as seen in Figure 8, to record this count, the S3 flip-flop may have to be triggered to a true state, but never back to a false state.

It should be noted that following the $P_2$ time the S4 flip-flop is reset to zero by equation $$os_4 = CP_2$$

The purpose for this is similar to the reason the S3 flip-flop was reset during the $P_1$ time. In this case the S4 flip-flop was storing the 5 weight component of the decimal digit output representing the sum of the previous cycle operation. This component, having been read out during the $P_2$ time, is no longer needed.

The grid input equations for the S counter flip-flops will now be described for the $P_3$ pulse time. The possible range of the total count, $K_C$, during the $P_3$ period is $0 \leq K_C \leq 9$. Thus all the S flip-flops must be considered during this period. Furthermore, as noted, during this period each external (high potential) input on $S_a$ or $S_b$ corresponds to a decimal weight of two units. Because of this, the input equations to the S1 flip-flop are automatically disposed of, since the S1 flip-flop only changes with unit inputs, thus:

$$s_1 = 0$$
$$os_1 = 0$$

The S2 flip-flop, which manifests changes in counts of 2 units, will change its state to the opposite one with each single external input fed in during the $P_3$ time. This is shown by equations:

$$s_2 = S_2'(S_aS_b' + S_a'S_b)CP_3$$
$$os_2 = S_2(S_aS_b' + S_a'S_b)CP_3$$

Referring to Figure 8, the S3 flip-flop during the $P_3$ time will change from a 0 to a 1 state when it is in a 0 state and at least two inputs are observed during this time each weighted as "two units." These two unit signals may consist of either a pair of external inputs, or the true state of the S2 flip-flop and one of the external inputs. Thus:

$$s_3 = S_3'(S_aS_b + S_aS_2 + S_bS_2)CP_3$$

If two such "two unit" manifestations are present during a $P_3$ time when the S3 flip-flop is already in a true state, the S3 flip-flop is rendered false since the observed decimal count becomes 8 or 9 which, as seen in the table of Figure 8, is represented by a 0 in the C3 flip-flop, hence:

$$os_3 = S_3(S_aS_b + S_aS_2 + S_bS_2)CP_3$$

As for the S4 flip-flop during the $P_3$ time, using the same reasoning which renders the S3 flip-flop false, if two "two unit" manifestations together with a true state of the S3 flip-flop are present during this period, the S4 flip-flop is rendered true by the equation:

$$s_4 = S_3(S_aS_b + S_aS_2 + S_bS_2)CP_3$$

On the other hand, the S4 flip-flop is never rendered false during the $P_3$ time since the count never exceeds decimal 9 hence:

$$os_4 = 0$$

The $P_4$ pulse time grid input equations will next be described.

The S1 flip-flop during the $P_4$ pulse time records the carry resulting from observing a count during this time equal to a decimal 10 through 19. By observing a count of at least 5 in the counter during this period along with at least one of the external inputs $S_a$ or $S_b$; or, by observing two external inputs, the S1 flip-flop is rendered true. Note that it is evidence of the "carry," only, which is required. Thus:

$$s_1 = [(S_1S_3 + S_2S_3 + S_4)(S_a + S_b) + S_aS_b]CP_4$$

The input to the S1 flip-flop to render it false during the $P_4$ pulse time will next be considered.

If during this time both S3 and S4 flip-flops are false there is either a decimal 0, 1, 2 or 3 in the counting stages. Thus if either one or the other inputs is false, as designated by $S_a'$ or $S_b'$, while S3 and S4 are false, no carry occurs during $P_4$ time and the S1 flip-flop is made false. It should be noted that when the counter has a decimal 4 therein, the S1 flip-flop is already false and hence this is an exception which will not be provided for. The S1 flip-flop is also made false whenever both external inputs are false. Symbolically this is written as:

$$os_1 = [S_3'S_4'(S_a' + S_b') + S_a'S_b']CP_4$$

The S2 flip-flop equations during the $P_4$ time are not important in counting but the flip-flop is reset to a false condition thus:

$$s_2 = 0$$
$$os_2 = CP_4$$

The reason for setting the S2 flip-flop false is so that the counter is cleared for the $P_1$ pulse time of the next cycle of operation which as previously noted requires the utilization of the S2 flip-flop.

During $P_4$ time, the S3 flip-flop is used for storing the weight 2 output potential. As noted in Figure 2, Table I, when the total count at $P_4$ time, i. e., $K_C$ is equal to 3, 4, 8 or 9, the S3 flip-flop should be made true. Referring back to Figure 8 it is noted that decimal count 3 is defined by the logical product $S_1S_2S_3'S_4'$. As for decimal count 4, since flip-flop S3 is already in a true state it can be omitted from the equation, the reasoning being that since it is already indicating a true state no provisions need be made for putting it in that state. The decimal 8 and 9 terms are uniquely characterized by a true state of the S4 flip-flop. Hence, the equation for defining which counts of the counter require a component 2 in the output is:

$$s\overline{3} = [S_1 S_2 S_3' S_4' + S_4] CP_4$$

It can be shown by examining the table in Figure 8 that $S_4'$ in the first product is redundant, and as a result the above equation can be further simplified as:

$$s_3 = [S_1 S_2 S_3' + S_4] CP_4$$

Looking at the conditions required to render the $S_3$ flip-flop false, as noted in Table I of Figure 2, the weight 2 component output potential is low when the total count at $P_4$ time, $K_c$, is equal to 0, 1, 2, 5, 6, or 7. Thus, the $S_3$ flip-flop which stores this weight 2 potential must be set into a false state.

Note that flip-flop $S_3$ is already in a false state when $K_c$ is equal to 0, 1, or 2; hence, the only requirements that must be met are those which will render flip-flop $S_3$ false when $K_c$ is equal to 5, 6, or 7. Referring to Figure 8, these latter contents are characterized by logical products $S_4' S_3 S_2' S_1$, $S_4' S_3 S_2 S_1'$ and $S_4' S_3 S_2 S_1$, respectively. Term $S_4'$ can be omitted here since it is quite obvious that whenever the $S_3$ flip-flop is true the $S_4$ flip-flop must necessarily be false, i. e., according to the table in Figure 8, both flip-flops $S_3$ and $S_4$ cannot be true at the same time. Symbolically adding these products and noting that $S_3$ is a common term in these products, the equation can be simplified as follows:

$$os_3 = S_3(S_1 S_2' + S_1' S_2 + S_1 S_2) CP_4$$

The equation can be further simplified to $$os_3 = S_3(S_1 + S_2) CP_4$$

Referring to the $S_4$ flip-flop, during the $P_4$ time, it is desired to hold therein the weight 5 pulse, as the result of the counting, which is to be fed out later as a component of the coded sum. Thus, the $S_4$ flip-flop is made true whenever the decimal sum output has the component 5 therein. Referring to Figure 2, it can be seen that this is true for an observed count of 5, 6, 7, 8, 9, 15, 16, 17, 18, or 19 during this time.

Assuming first that no inputs are evident on $S_a$ or $S_b$ during the $P_4$ time, if the counter contents is a decimal 5, 6, 7, 8 or 9, the $S_4$ flip-flop is made true. Decimals 5 and 7 are observed in Figure 8 to be characterized by the product of terms $S_1 S_3$; decimals 6 and 7 by product $S_2 S_3$, and decimals 8 and 9 by the term $S_4$. Combining these conditions the first complex proposition $(S_1 S_3 + S_2 S_3 + S_4)$ is obtained for the $s_4$ equation.

Assuming next that the inputs $S_a$ and $S_b$ are taken into account, if neither or both of these inputs are present, the observed count includes the component 5 in the output and the $S_4$ flip-flop is to be rendered true. Thus, the second complex proposition $(S_a S_b + S_a' S_b')$, multiplying the first, provides for both these possibilities.

Another manner of obtaining an observed count which will require a 5 component in the output is when the counter content during $P_4$ time is 0, 1, 2, 3, or 4 and one, but not both, of the inputs $S_a$ or $S_b$ (weighted 5 units) is effective. An expression which includes only these counts in the counter contents is $S_4'(S_1' S_2' + S_3')$. The $S_4' S_3'$ product is only true for the decimal contents 0 through 3. The decimal 4 is characterized by the product $S_4' S_1' S_2'$. Adding these two products and factoring out the term $S_4'$ gives the desired expression. The introduction of one, but not both, of the inputs $S_a$ or $S_b$ during this time is symbolically expressed by $(S_a S_b' + S_a' S_b)$. Thus, collecting the above complex expressions, the equation for rendering the $S_4$ flip-flop true during the $P_4$ time is:

$$s_4 = [(S_1 S_3 + S_2 S_3 + S_4)(S_a S_b + S_a' S_b') + S_4'(S_1' S_2' + S_3')(S_a S_b' + S_a' S_b)] CP_4$$

Referring next to the triggering equation for rendering the $S_4$ flip-flop false, this condition is desirable when the observed count during the $P_4$ time does not require a 5 component in the output from the summer.

By noting Table I in Figure 2, these counts are observed to be the decimal numbers 0 through 4 and 10 through 14.

In Figure 8 it is noted that the counts 0 through 4 in the counter are characterized by the $S_4$ flip-flop being already in the zero state. Thus, there is no need for providing for these changes. Likewise if two external inputs, $S_a$ and $S_b$, are received during this time, along with the contents 0 through 4 in the counter, so as to give an observed count of 10 through 14, no change need be made in the $S_4$ flip-flop since it is already in the zero state.

There is, however, one set of conditions which must be provided for rendering the $S_4$ flip-flop false. This condition is when there is an input (high potential) on one or the other of the $S_a$ or $S_b$ inputs, and a content of 5 through 9 in the counter. The combined count is then in the range 10 through 14. As observed in Figure 8 for counter contents 5, 6 and 7 the $S_4$ flip-flop is already 0 and, as before, this change need not be provided for; but the 8 and 9 contents of the $S$ counter demand that the $S_4$ flip-flop be changed from a true to a false state in order to indicate therein that no 5 component output is available.

The contents 8 and 9 are uniquely characterized by a "1" in the $S_4$ flip-flop; as a result the equation for rendering the $S_4$ flip-flop false can be completely defined by the equation:

$$os_4 = S_4(S_a S_b' + S_a' S_b) CP_4$$

The logical equations for defining the output from the summer by means of the coded decimal representation will now be described. As was previously noted the corresponding weighted pulses in the output are delayed by two pulse times with respect to the input. As shown in Figure 1, the first potential period of the output is noted at $P_3$ time. Thus, the decimal block of the output is evidenced at $P_3$, $P_4$, $P_1$ and $P_2$ times for the components 1, 1, 2 and 5, respectively.

Because of the particular way in which the output representing the sum is used in computation, it is often desirable to generate a waveform representing the logical inverse of the true sum waveform. The reason for this is so that the output waveform generated can then be fed into an amplifier before applying it onto a memory such as a rotating magnetic wheel, for example. The amplifying device inverts the signal applied thereto, thus, giving the desired waveform at its output.

For this reason, the symbolic equation for the logical inverse of the binary coded output waveform is here presented, but it is to be realized that this choice is arbitrary in that, if desired, the sum waveform could be obtained directly.

The decision as to whether or not a component is to be made effective in the output for a given content of the summer counter is determined by Table I in Figure 2. The first component, weighted 1, is fed out of the summer during $P_3$ time.

During this time the count $K_B$ can be observed in the counter and, if $K_B = 0$ or 5 and there are no high incoming potentials at $P_3$ time, there will be a zero output at this time, as noted by Table I of Figure 2. Since it is the logical inverse of the sum which is desired, it is the observance of the zero outputs which determine the nature of the output logical equation.

The symbolic expressions for $K_B = 0$ and $K_B = 5$ and no incoming digits are:

$$S_1' S_2' S_3' S_a' S_b'$$

and $$S_1 S_3 S_a' S_b'$$

respectively.

Also if the content of the $S$ counter, $K_B$, is 1 and both external inputs, each weighted two units, are effective, as noted by $S_1 S_2' S_3' S_a S_b$, the count observed is equal to 5.

Also if the contents of the S counter is 3, and one but not both of the external inputs has a high potential, as noted by $S_1S_2S_aS_b' + (S_a'S_b)$, the observed count during the $P_3$ time is equal to 5.

Collecting all these conditions the logical expression which represents the first component of the output block, as observed during the $P_3$ time, is:

$$S_0' = F_1'F_2'[S_1'S_2'S_3'S_a'S_b' + S_1S_3S_a'S_b' + S_1S_2'S_3'S_bS_b + S_1S_2(S_aS_b' + S_a'S_b)]$$

During the $P_4$ time the output potential from the summer, if high, indicates that the second component "1" of the sum output is to be omitted.

Referring to Table I of Figure 2, if $K_c = 0, 1, 3, 5, 6$, or 8 there will be a high potential at the output. Referring to Figure 8, the conditions of the S counter which evidence these counts are:

$$0 = S_4'S_3'S_2'S_1'$$
$$1 = S_4'S_3'S_2'S_1$$
$$3 = S_4'S_3'S_2S_1$$
$$5 = S_4'S_3S_2'S_1$$
$$6 = S_4'S_3S_2S_1'$$
$$8 = S_4S_3'S_2'S_1'$$

Taking counts 0 and 8 together, it can be seen that these two terms can reduce to $S_3'S_2'S_1'$ since $(S_4 + S_4') = 1$.

In a similar manner taking counts 1 and 3, it is made evident that these two terms reduce to $S_4'S_3'S_1$ since $(S_2 + S_2') = 1$.

As for counts 5 and 6, it can be shown that the term $S_4'$ is redundant in these expressions because of the range of the counts which cannot exceed 9. An $S_4$ term (8) along with an $S_3$ term (4) would necessarily be out of the range of possibilities. Thus, the expression for the output during $P_4$ time, is:

$$S_0' = (S_1'S_2'S_3' + S_1S_3'S_4' + S_1S_2'S_3 + S_1'S_2S_3)F_1F_2'$$

During the $P_1$ time, the output indicative of the weight 2 potential is to be fed out of the summer circuit.

It was possible to determine whether this component would appear in the output during the previous $P_4$ timing pulse. At that time, the $S_3$ flip-flop was made true if the component was to be represented in the output sum.

Since the logical inverse of the sum is desired, when $S_3'$ is high there is no weight 2 potential to be fed out. This is indicated by $$S_0' = F_1'F_2S_3'$$

Finally during $P_2$ time, the indication for the weight 5 potential is read out. This output was previously recorded in the $S_4$ flip-flop during $P_4$ time. When $S_4'$ is high there is no weight 5 output potential. This is indicated by:

$$S_0' = F_1F_2S_4'$$

Combining all these outputs the equation becomes:

$$S_0' = F_1'F_2'[S_1'S_2'S_3'S_a'S_b' + S_1S_3S_a'S_b' + S_1S_2'S_3'S_aS_b + S_1S_2(S_aS_b' + S_a'S_b)] + F_1F_2'(S_1'S_2'S_3' + S_1S_3'S_4' + S_1S_2'S_3 + S_1'S_2S_3) + F_1'F_2S_3' + F_1F_2S_4'$$

Before presenting the physical circuits for generating the logical equations needed for the grid inputs to the S counter flip-flops, further simplification of the equations, as shown, is desirable.

The first step in this simplification is obtained by writing a single equation for the grid input to each of the flip-flops. For example instead of having as many as four triggering equations, as in Figure 9, one for each of the timing pulses $P_1$, $P_2$, $P_3$ and $P_4$, respectively, a single equation can be written for the $s_1$ grid input.

$$s_1 = S_1'(S_aS_b' + S_a'S_b)CP_1 + S_1'(S_aS_b' + S_a'S_b)CP_2 + [(S_1S_3 + S_2S_3 + S_4)(S_a + S_b) + S_aS_b]CP_4$$

By substituting the F terms for the P timing pulses, and factoring out common terms this equation reduces to $$s_1 = [F_2S_1'(S_aS_b' + S_aS_b)(F_1' + F_1) + F_1F_2'(S_1S_3 + S_2S_3 + S_4)(S_a + S_b) + F_1F_2'(S_aS_b)]C$$

It should be noted that $(F_1' + F_1) = 1$ and can be dropped out of the equation.

In a similar manner the overall $_{0}s_1$ equation can be shown to be equal to:

$$_{0}s_1 = [F_2S_1(S_aS_b' + S_a'S_b) + F_1F_2'S_3'S_4'(S_a' + S_b') + F_1F_2'S_a'S_b']C$$

As for the S2 flip-flop grid equations, these may be collected to obtain the following:

$$s_2 = [(S_aS_b + S_aS_1 + S_bS_1)(F_1'F_2 + S_2'F_1F_2) + S_2'(S_aS_b' + S_a'S_b)F_1F_2']C$$

It can be assumed that an $S_2'$ term appears in the first term of the second parenthesis which is valid since the S2 flip-flop is always false for the $P_1$ time. This enables the second parenthesis to be eliminated and replaced by a single product, $F_2S_2'$. The equation can thus be written as:

$$s_2 = [F_2S_2'(S_aS_b + S_aS_1 + S_bS_1) + F_1F_2'S_2'(S_aS_b' + S_a'S_b)]C$$

The equation for the false grid of the S2 flip-flop can be expressed by the overall equation:

$$_{0}s_2 = [S_2(S_aS_b + S_aS_1 + S_bS_1)F_1F_2 + S_2(S_aS_b' + S_a'S_b)F_1'F_2' + F_1F_2']C$$

Note in Figure 9 that the $_{0}s_2$ equation at $P_1$ time is equal to 0. However, it can be assumed that it is equal to $$_{0}s_2 = S_2(S_aS_b + S_aS_1 + S_bS_1)CP_1$$

without having any effect since the S2 flip-flop is always set false after the previous $P_4$ time, and consequently $S_2$ can never be of high potential during the $P_1$ time.

The only difference between the above expression and the $_{0}s_2$ equation for $P_2$ time are the timing pulses themselves. As has already been described, by substituting the F terms for the $P_1$ and $P_2$ timing pulses, the expressions reduce to the single term $F_2$ because the F1 flip-flop terms are shown to be superfluous.

Thus the underlined $F_1$ term can be eliminated from the overall $_{0}s_2$ equation presented above.

The true grid equations of the S3 flip-flop can be combined to form the single equation:

$$s_3 = [S_2(S_aS_b + S_aS_1 + S_bS_1)F_1F_2 + S_3'(S_aS_b + S_aS_2 + S_bS_2)F_1'F_2' + (S_4 + S_1S_2S_3')F_1F_2']C$$

The false grid equations of the S3 flip-flop are combined to form the single equation:

$$_{0}s_3 = [F_1'F_2 + S_3(S_aS_b + S_aS_2 + S_bS_2)F_1'F_2' + S_3(S_1 + S_2)F_1F_2']C$$

The true grid equations of the S4 flip-flop can be written:

$$s_4 = \{S_3(S_aS_b + S_aS_2 + S_bS_2)F_1'F_2' + [(S_1'S_3 + S_2S_3 + S_4)(S_aS_b + S_a'S_b') + S_4'(S_1'S_2' + S_3')(S_aS_b' + S_aS_b)]F_1F_2'\}C$$

And the false grid equations of the S4 flip-flop can be written as:

$$_{0}s_4 = [F_1F_2'S_4(S_aS_b' + S_a'S_b) + F_1F_2]C$$

Figure 10:
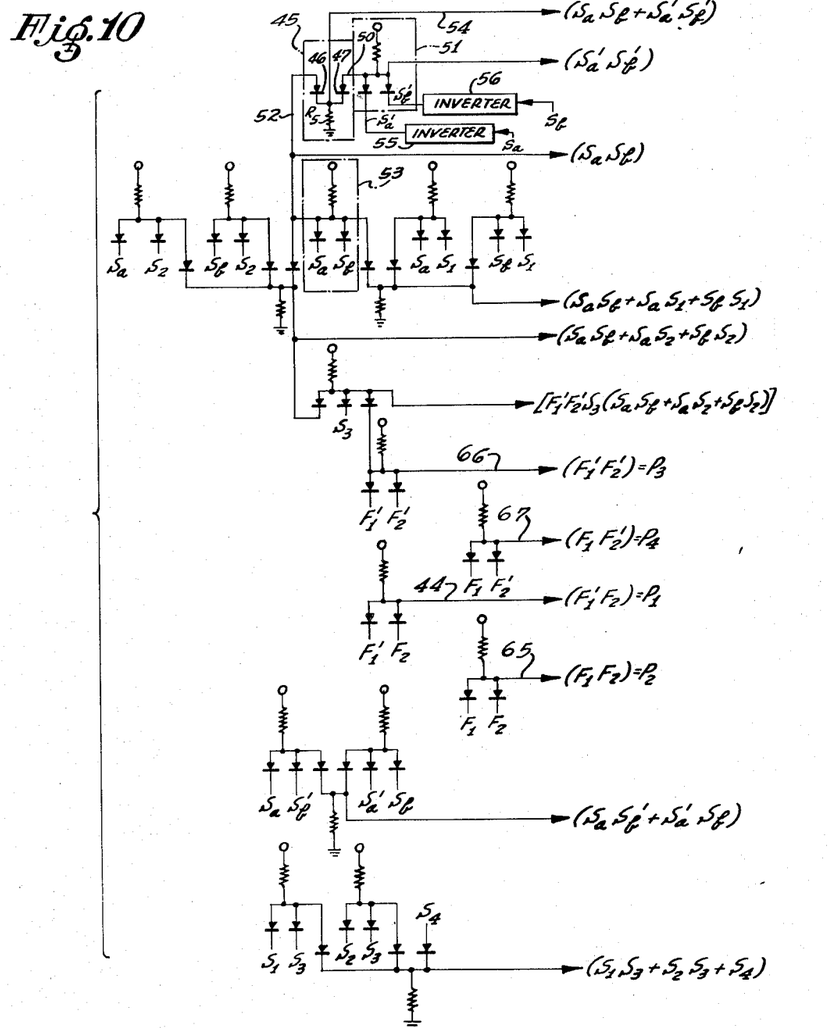
Figure 10 is a diode net for generating complex propositions which are used a plurality of times in the logical diode nets.
Figure 11:
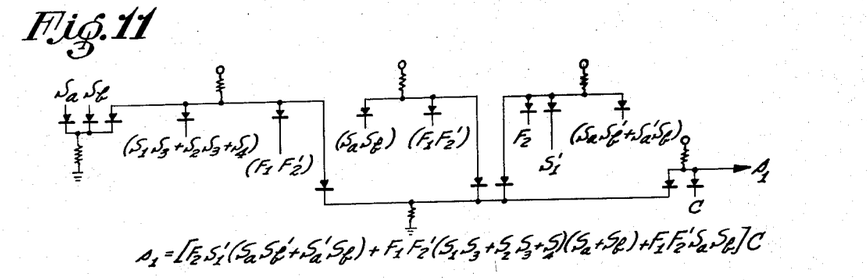
Figures 11 and 12 are schematic circuit diagrams of the grid input logical nets for the S1 flip-flop.
Figure 12:
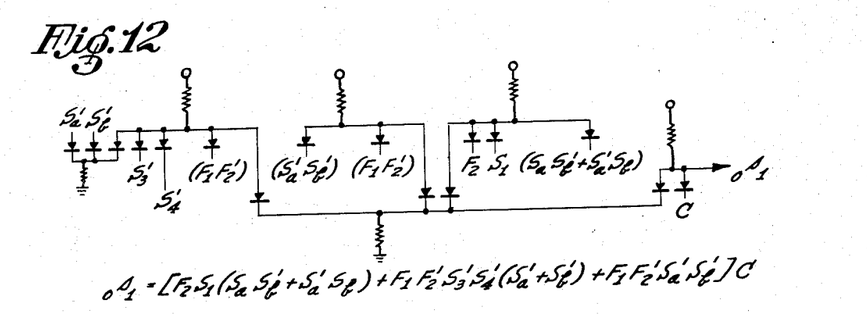

To obtain the physical circuits for generating the logical equations needed for the grid inputs to the S counter flip-flops, it is noted that certain of the combinations of terms are used repeatedly in several equations. By generating each of these certain combinations once, a single derived proposition is available which can be introduced where needed with other terms to solve the various equations. In Figure 10, the logical nets for generating these combinations of terms are shown.

The typical "logical addition" is here introduced. This circuit, as shown by block 45 in Figure 10, is comprised in this case of a pair of input diodes 46 and 47 whose cathode-ends are joined and returned to ground through a common resistor R5. The input terms to the circuit are fed in on the anode-ends of the diodes. Here, the input 50 represents the products $S_a'S_b'$ as obtained from the first product circuit 51 and the input 52 represents the product $S_aS_b$ as obtained from the second product circuit 53. When either one, or both, of the inputs to logical addition circuit 45 is relatively high in potential, output line 54 is raised to a relatively high potential indicative of the logical sum $(S_aS_b+S_a'S_b')$. Thus in general it can be stated that in a logical addition circuit, regardless of the number of inputs, the output potential equals the highest input potential.

It should be understood that the inputs $S_a$ and $S_b$ are here shown to be fed through inverters 55 and 56, respectively, so as to obtain their logical inverses $S_a'$ and $S_b'$, which are needed as terms in the equations. The actual source of $S_a'$ and $S_b'$ could, however, be obtained from the false outputs of say, flip-flops $S_a$ and $S_b$, respectively, if such a source were used for the incoming coded digits.

The diode networks provided for solving the remaining combinations are comprised of typical logical product and logical sum circuits. In each case, the output line is marked with a bracketed function which it represents.

In Figures 11 through 17, the logical nets for physically solving the triggering equations for the S1, S2, S3 and S4 flip-flops are shown. In each case, the logical equation for either the true or false grid is written below the net which, in effect, solves it. It should be noted that the inputs to the nets defined by bracketed functions represent the complex terms already generated by the network in Figure 10. The output from the logical net, in each case, is obtained from a final logical product circuit which includes among other possible common terms, a clock pulse.

In order to simplify the logical nets, occasionally a term is introduced which multiplies one of a plurality of complex combinations which are being logically added together. This is permissible if the term introduced represents the opposite state of the flip-flop from that which the equation is to control. This makes it possible to factor out this term so that it need only be introduced once in the final product circuit along with the clock pulse C. An example of this is in Figure 13 where the term S2 (shown broken) was introduced into the last combination of the $o_{s2}$ equation. This term appeared in the previous two combinations which were to be symbolically added to this last one.

Figure 13:
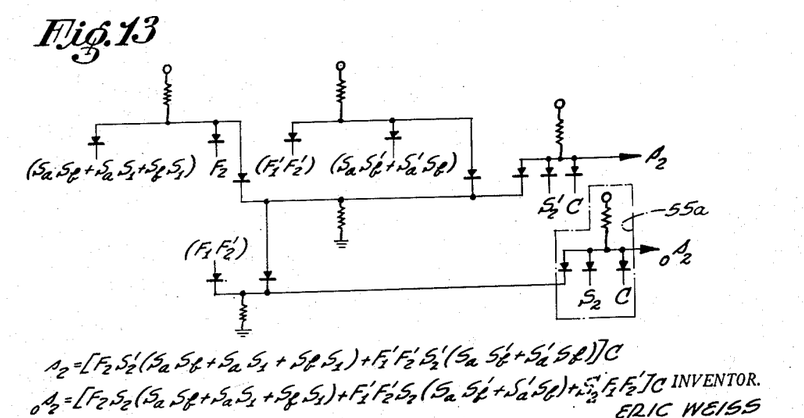
Figure 13 is a schematic circuit diagram of the grid input logical nets for the S2 flip-flop.

Referring to the logical net for generating $o_{s2}$, it is noted that the S2 term is only introduced once in the final product circuit 55a.

Figure 14:
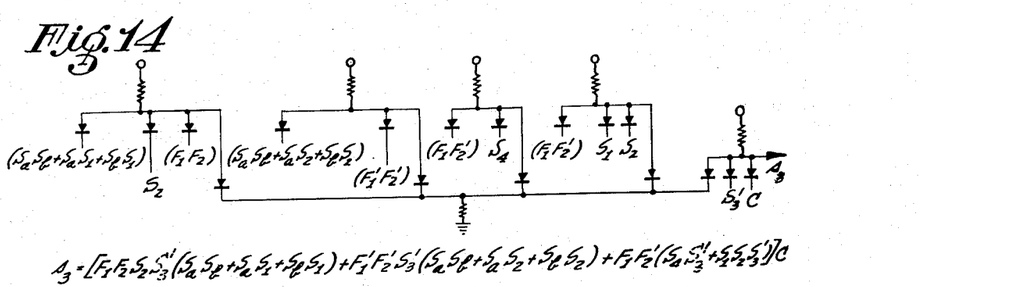
Figures 14 and 15 are schematic circuit diagrams of the grid input logical nets for the S3 flip-flop.
Figure 15:
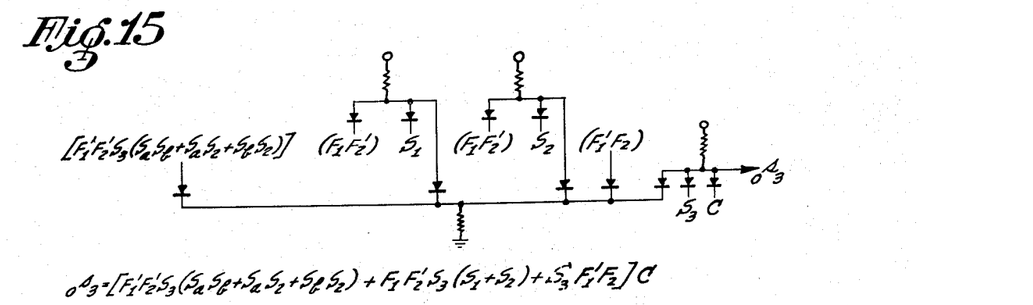
Figure 16:
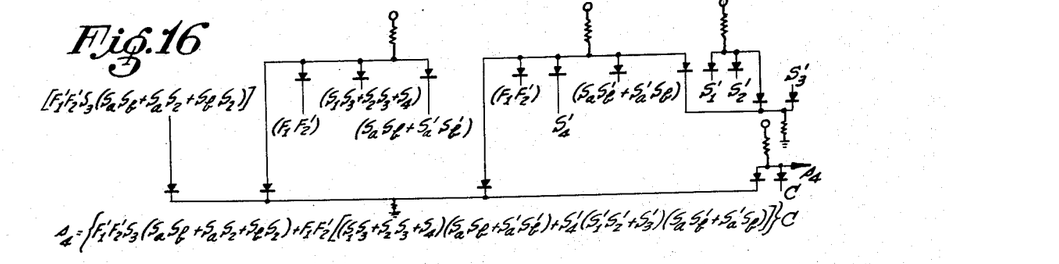
Figures 16 and 17 are schematic circuit diagrams of the grid input logical nets for the S4 flip-flop.
Figure 17:
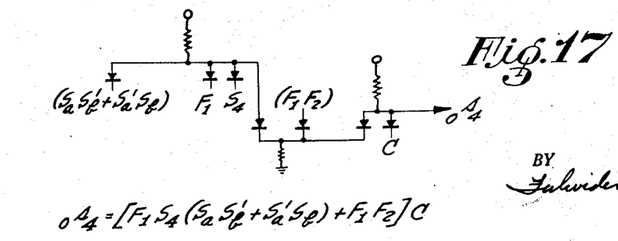

This same change in the logical circuits is made in Figures 14 and 15 which generate the $s_3$ and $o_{s3}$ triggering equations, respectively.

Figure 18:
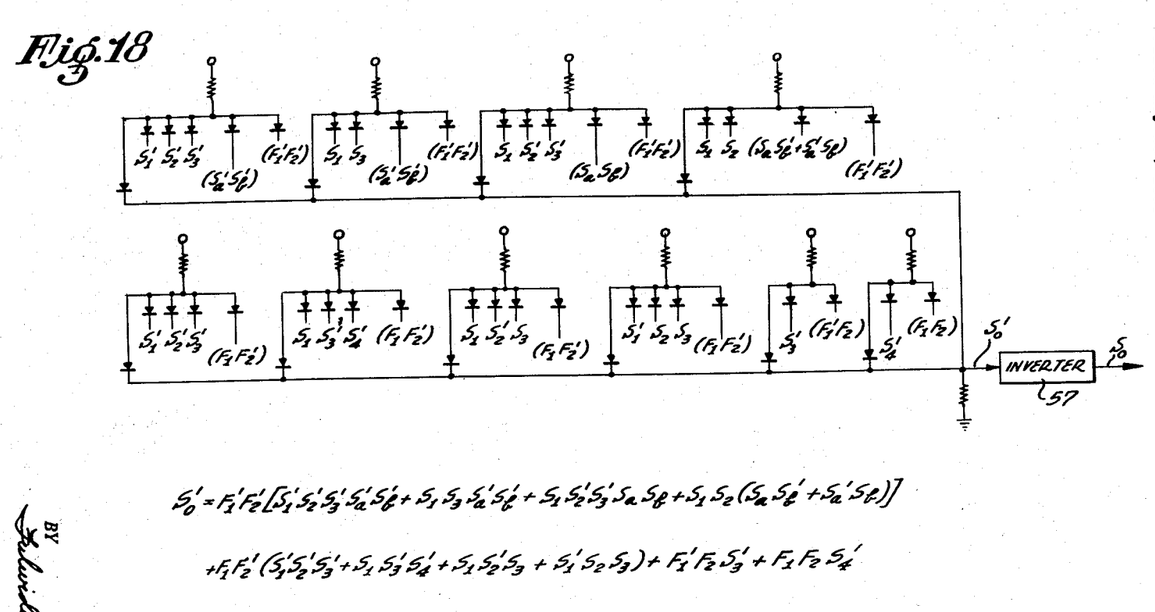
Figure 18 is a schematic circuit diagram of the output logical nets for generating the voltage waveform representing the sum.

In Figure 18, the logical circuit for generating the logical inverse of the sum output waveform, $S_0'$ is presented. By feeding the $S_0'$ logical net output into an inverter 57, which may be an amplifier, for example, the desired waveform $S_0$ can be obtained.

Here the output is not synchronized with a clock pulse, as was each of the grid equations, since the output is not being used to trigger a flip-flop.

This output wave can be fed, for example, into a memory or may be observed by means of an oscillograph, depending on how the summer circuit fits into the remaining system of a computer.

Referring back to Figure 1, the operation of the summining circuit 10, upon receiving the coded digits there shown, will next be described in detail.

The contents of the S1, S2, S3, and S4 flip-flops are all zero initially, that is, they are all in their false states. Upon receipt of the unit inputs (high potentials) present on $S_a$ and $S_b$ during $P_1$ time of the first cycle, the circuits are set up so as to trigger the S2 flip-flop to a true state at the end of the $P_1$ timing period. The counter now contains the decimal 2. During the $P_2$ time of the first cycle, unit inputs are again shown to be present on both $S_a$ and $S_b$. As a result of this, at the end of the $P_2$ period, the S2 flip-flop is caused to be made false and the S3 flip-flop to be made true, thus recording a decimal 4 in the counter. During the $P_3$ time of the first cycle, the $S_a$ potential is noted to be low and the $S_b$ potential to be high. Each high potential during this time represents a weight 2 component and as a result of receiving this single input the S2 flip-flop is triggered true. Both the S2 and S3 flip-flops are now true, and as seen by Figure 8, this represents a decimal 6 content.

As previously mentioned, there is an inherent two clock pulse delay with which the summer emits binary digit outputs with respect to corresponding binary digit inputs. This delay is determined by the maximum number of additional input binary digits which must be observed in order to determine any of the output binary digits. In the present system, in order to determine the first output component of a digit, the first three input components must be observed.

Thus during $P_3$, the first component of the output number weighted 1 can be determined by observing the counter contents and the inputs $S_a$ and $S_b$. As previously described, when the total observed count during this time is 0 or 5, no output (low potential) is emitted. Conversely, an output (high potential) is emitted for any other count, which is the case of the present example. Hence, a high potential is fed from the summer during the $P_3$ period.

During the $P_4$ time the weight 5 components of the coded digits are received. As shown, only one of these, $S_a$, is received during the first cycle.

It should be noted that the inputs during the $P_4$ time are never recorded as a count in the counter. At this point, since all the components of the incoming digits have been observed, all the remaining components of the outgoing digit can be determined. Thus by noting what the total observed count is, the following decisions are made during the $P_4$ time: firstly, the existence of the second component of the output, weighted 1, is determined and fed out; secondly, the existence of the third component of the output, weighted 2, is determined and stored at the end of this time in the S3 flip-flop; thirdly, the existence of the fourth component of the output, weighted 5, is determined and stored at the end of this time in the S4 flip-flop; and fourthly, the decimal carry, if any, is determined and stored at the end of this time in the S1 flip-flop.

In the present example, during the $P_4$ time, the counter content 6 together with the observed input weighted 5 gave the decimal 11. This means a coded binary number (Figure 2) equivalent to the decimal 1 is to be fed out and a decimal carry is to be added to the following incoming digits.

As shown in Figure 2, the second component of the outgoing coded digit representing decimal 1 is absent. Hence, in accordance with the output logical net previously described, a low potential is fed out during the $P_4$ time from the summer. Likewise the third component weighted 2 is absent in the output. This fact results in the S3 flip-flop being triggered to a false state. Lastly, the weight 5 component is seen to be absent in the output and so the S4 flip-flop is triggered to a false state.

During $P_1$ and $P_2$ times of the next cycle of operation of the summer, while the S1 and S2 flip-flops are being used to count the first two component inputs of the next input coded digit, the weight 2 and weight 5 output components are fed out of the S3 and S4 flip-flops, respectively, in this case the potentials being low. As these components are fed out, the corresponding flip-flops are reset to a false state so that they can again be used for counting during the $P_3$ time.

This completes one cycle of operation of the summer circuit showing how the first input digit 7 when added to the first input digit 4 gives the first output digit 1. The following input digits 1 and 6 on $S_a$ and $S_b$, respectively, when fed through the counter, taking into account the decimal carry, then feeds out the second output digit 8.

While the circuits as shown and described herein are admirably adapted to fulfill the objects and features of advantage previously enumerated as desirable, it is to be understood that the invention is not to be limited to the specific features shown but that the means and construction herein disclosed are susceptible of modification in form, proportion, and arrangement of parts without departing from the principle involved or sacrificing any of its advantages, and the invention is therefore claimed in embodiments of various forms all coming within the scope of the claims which follow.

What is claimed is:

1. A serial summer circuit comprising means for receiving a first and second incoming number formed of groups of serially disposed binary digits which represent digits of a decimal system, each of said groups composed of four digital positions each weighted to correspond to components of the decimal digit, a source of clock pulses synchronized in time with said binary digits, means for counting said clock pulses for generating timing periods in repeated cycles corresponding to the position of the binary digits in a group, four bistable state circuits disposed so that each corresponds to successive stages of a binary counter, circuit means associated with said bistable state circuits for registering therein during three of said timing periods a binary count of said binary input digits in accordance with their weight, output circuit means for feeding out starting at some intermediate timing period the output binary digits obtained by observing the count in said bistable state circuits and the received input binary digits, storing circuit means responsive to the contents of said bistable state circuits and the incoming binary digits during the remaining timing period for storing in the higher stages of said bistable state circuits at the end of said remaining timing period the output binary digits not yet fed out, and for storing in the first stage bistable state circuit a carry, and circuit means for feeding out said stored binary digits one at a time during following timing periods.

2. A serial summer circuit comprising means for receiving a first and second incoming number formed of groups of serially disposed binary digits which represent decimal digits, each of said groups composed of four digital positions, each weighted to correspond to the decimal components 1, 1, 2, and 5, respectively; a source of clock pulses synchronized in time with said digital positions; means for counting said clock pulses for indicating in repeated cycles a first, second, third and fourth timing period related to said digital positions; four bistable state circuits disposed so that each corresponds to a stage of a binary counter, each of said bistable state circuits having a pair of outputs indicating the states thereof and a pair of input circuits for controlling the states thereof; a plurality of logical circuits each connecting the output circuits of said bistable state circuits and the summer receiving means to the inputs of said bistable state circuits in accordance with a predetermined arrangement, said logical circuits including, a counting circuit operating to register in the first two of said bistable state circuits at the end of said first timing period and in the first three of said bistable state circuits at the end of said second timing period the accumulated binary count of the incoming binary digits weighted as units, and for registering in all of said bistable state circuits at the end of said third timing period the accumulated binary count including the incoming binary digits weighted two units; a first output circuit operating during said third timing period to feed out a first binary digit of a group representing the decimal digit of an outgoing number, and operating during said fourth timing period to feed out a second binary digit; a storing circuit operating during said fourth timing period to store in the last two bistable state circuits the third and fourth output binary digits, and to store in the first bistable state circuit a decimal carry in accordance with said accumulated binary count and the incoming binary digits weighted five units; a first clearing circuit operating during said fourth timing period for clearing said second bistable state circuit; a second output circuit operating during the first and second timing periods, respectively, of the succeeding timing cycle to feed out said stored third and fourth binary digits; and a second clearing circuit operating during said first and second timing periods, respectively, of the succeeding timing cycle to clear said third and fourth bistable state circuits.

3. A summing circuit for generating an outgoing coded number which is the sum of a pair of incoming coded numbers comprising: a pair of input lines, each serially receiving binary signals representing one of said incoming numbers, a group of four binary signals on an input line representing each of the digits of said numbers, each of the binary signals in a group weighted to represent components of said coded digits; a plurality of bistable state circuits; a first circuit means associated with said bistable state circuits and successively responsive to the first three binary signals in the groups representing the same order coded digits of the incoming numbers for registering information concerning their combined weight count; and a second circuit means associated with said bistable state circuit and responsive to said registered information and the last two binary signals in said groups for deriving a group of binary signals representing the same order coded digit of the outgoing number.

4. A summing circuit for generating an outgoing coded decimal number which is the sum of a pair of incoming coded decimal numbers, comprising: a pair of inputs, each of said inputs being impressed by groups of binary signals representing single digits of said incoming numbers, each of the binary signals in a group weighted to represent components of said digits; a plurality of bistable state devices; a first circuit means serially responsive to the binary signals on both said inputs for registering in said bistable state devices a combined weight count of a portion of the binary signals in the incoming groups representing the same order digits; an output; a second circuit means responsive to said weight count and the remaining binary signals in said incoming groups to derive a group of binary signals to be impressed on said output representing a digit having the corresponding order in said outgoing number and a third circuit means for storing some of the output binary signals in said bistable state devices prior to impressing them on said output.

5. A summer circuit comprising: means for simultaneously receiving a pair of incoming coded decimal numbers formed of groups of serially disposed binary signals, each of said groups representing a decimal digit, each of the binary signals in a group weighted to correspond to components of the coded digits; a plurality of bistable state circuits; a first circuit means associated with said bistable state circuits for registering therein information concerning the combined weight count of a portion of the incoming binary signals representing the same order coded digits of the numbers to be added; a second circuit means responsive to said weight count and the remaining incoming binary signals representing said coded digits to derive a group of binary signals representing a digit having a corresponding order in the outgoing number; a third circuit means for temporarily registering some of the derived binary signals of said outgoing group in said bistable state circuits; and a fourth circuit means for serially feeding out the binary signals of said outgoing group in order, whereby the binary signals of the succeeding pair of incoming binary coded digits are being counted by said first circuit means and being registered in some of said bistable state circuits while some of the binary signals of said outgoing coded digit are still being stored in said remaining bistable state circuits.

6. A serial summer circuit comprising: means for receiving a first and second incoming number each formed of sets of serially received binary signals which represent decimal digits, each of said sets comprised of four digital periods each weighted to correspond to components of the decimal digit; means for registering at the end of each of said first three digital periods an accumulated weight count of the binary signal inputs and manifesting said count by binary signals; means for generating the first binary signal of an output set representing the decimal digit of the sum during the third digital period in response to the accumulated count binary signals and the incoming binary signals; means for generating the second binary signal of said output set during the fourth digital period in response to the accumulated count binary signals and the incoming binary signals; means for determining the remaining binary signals of said output set during said fourth digital period in response to the accumulated count binary signals and the incoming binary signals and causing said remaining binary signals to be manifested as output binary signals from said registering means at the end of said fourth digital period; and means for generating said remaining binary signals of said output set in order during the first two digital periods associated with the following incoming sets of binary signals.

7. A cyclically operated summing circuit for generating an outgoing coded number corresponding to the sum of a pair of incoming coded numbers comprising: means for simultaneously receiving groups of serially disposed binary signals representing digits of a numbering system having a radix greater than two, each of the binary signals in a group having a positional weight corresponding to components of the digits in said numbering system; a source of clock pulses synchronized in time with said binary signals; means counting said clock pulses for cyclically generating timing signals corresponding to the position of said binary signals in a group; a plurality of bistable state circuits; a first circuit means controlled by said timing signals to respond to said incoming binary signals for registering in said bistable state circuits during each cycle of said counting means information concerning the accumulated weight count of a portion of the binary signals in corresponding incoming groups; and a second circuit means controlled by said timing signals to respond to said registered information in said bistable state circuits and said incoming binary signals for generating a group of outgoing binary signals representing a digit of the output coded number, whereby said outgoing group of binary signals is delayed with respect to said corresponding incoming groups of binary signals by an interval less than a cycle of said counting means.

8. A serial summer circuit comprising: means for receiving on separate input lines a first and second incoming number each formed of sets of four serially received binary signals representing a single decimal digit, each of said sets comprised of four digital periods each weighted to correspond to components of a decimal digit; counting means having a plurality of count lines responsive to the binary signals on said summer input lines for registering at the end of each of said first three digital periods an accumulated weight count of the binary signal inputs and manifesting said count by binary signals on said count lines; a summer output line; means for generating on said summer output line during the third digital period the first binary signal of a set representing the decimal digit of the sum in response to binary signals on said count lines and the incoming binary signals on said input lines; means for generating on said summer output line the second binary signal of said output set during the fourth digital period in response to binary signals on said count lines and the incoming binary signals on said input lines; means for determining the third and fourth binary signals of said output set during said fourth digital period in response to binary signals on said count lines and the incoming binary signals on said input lines and causing said output binary signals to be manifested as output binary signals on certain of said count lines at the end of said fourth digital period; and means for generating on said summer output line the third and fourth binary signals of said output set during the first two digital periods associated with the following incoming sets of binary signals in response to binary signals on said certain count lines.

9. A serial summer circuit comprising: means for receiving a first and second incoming number formed of groups of serially disposed binary signals which represent digits of a decimal system, each of said groups composed of four digital positions each weighted to correspond to components of the decimal digit; a source of clock pulses synchronized in time with said binary signals; means counting said clock pulses for generating timing signals in repeated cycles corresponding to the positions of the binary signals in a group; a plurality of bistable state circuits disposed so that each corresponds to successive stages of a binary counter; circuit means responsive to the count in said bistable state circuits and the incoming binary signals for registering in said bistable state circuits at the end of each of the first three timing signals a binary weight count of said binary input signals; a first output circuit means responsive to the count in said bistable state circuits and the incoming binary signals for feeding out during the third timing signal the first output binary signal; a second output circuit means responsive to the count in said bistable state circuits and the incoming binary signals for feeding out during the fourth timing signal the second output binary signal; storing circuit means responsive to the contents of said bistable state circuits and the incoming binary signals during the period of the fourth timing signal for storing in the last two stages of said bistable state circuits at the end of said fourth timing signal the last two output binary signals of the sum and for storing in the first stage bistable state circuit a carry signal; and circuit means for feeding out said stored binary signals one at a time during the periods of the following two timing signals.

10. A summing circuit for generating an outgoing coded decimal number which is the sum of a pair of incoming coded decimal numbers comprising: a pair of inputs, each serially sensing binary signals representing said incoming numbers, a group of four binary signals on an input representing each of the decimal digits of said number, each of the binary signals in a group weighted to represent components of the decimal digit; a plurality of bistable state circuits; a first circuit means for registering information in said bistable state circuits concerning the combined weight count of the first three binary signals in the groups representing the same order decimal digits of the incoming numbers; an output; a second circuit means responsive to the last two binary signals in said groups and the registered information in said bistable state circuits for deriving a group of binary signals to be fed on said output, said latter group representing the decimal digit of the outgoing number; and a third circuit means for registering in said bistable state circuits the last two signals in the output group prior to impressing them onto said output.

11. A summing circuit for generating an outgoing coded decimal number which is the sum of a pair of incoming coded decimal numbers, comprising: a pair of inputs, each receiving binary signals representing one of said incoming numbers, a group of said binary signals on each input representing a decimal digit, each of the binary signals in a group weighted to represent components of the decimal digit; a plurality of bistable state devices; a first circuit means associated with said bistable state devices for registering therein a combined weight count of a portion of the incoming binary signals representing the same order decimal digits of the incoming numbers; an output; a second circuit means responsive to said weight count and the remaining incoming binary signals representing said same order digits to derive a group of binary signals to be fed on said output, said latter group representing the decimal digit of the outgoing number; a third circuit means associated with said bistable state devices for registering therein some of the binary signals of said latter group prior to impressing them on said output; and a fourth circuit means associated with said bistable state devices for registering in one of said bistable state devices a carry-over to be added to the weight count of the incoming groups of binary signals representing the next higher order decimal digits of the incoming numbers.

12. A summing circuit for generating an outgoing coded decimal number corresponding to the sum of a pair of incoming coded decimal numbers comprising: means for simultaneously receiving a first and second train of binary signals representing said first and second incoming numbers, respectively, a group of four binary signals on a train representing each of the decimal digits of said numbers; a timing circuit for generating four timing signals defining each of the four signals in said groups according to a given code; a plurality of bistable state devices; a first circuit means controlled by said first, second, and third timing signals and responsive to concurring signals on the incoming trains for registering in said bistable state devices a combined count of the signals representing the same order decimal digits of said incoming numbers; a second circuit means controlled by said third and fourth timing signals and responsive to concurring signals on the incoming trains and the information registered in said bistable state devices for generating on an outgoing train the first and second binary signals of a group representing the sum decimal digit, and for storing the third and fourth binary signals of said latter group in said bistable state devices; and a third circuit means controlled by said first and second timing signals and responsive to the information registered in said bistable state devices for generating the third and fourth binary signals of the sum decimal digit on said outgoing train.

References Cited in the file of this patent

UNITED STATES PATENTS

| | | |
|---|---|---|
| 2,404,047 | Flory | July 16, 1946 |
| 2,429,227 | Herbst | Oct. 21, 1947 |
| 2,634,052 | Bloch | Apr. 7, 1953 |

OTHER REFERENCES

Progress Report (2) on the Edvac., Moore School of Electrical Engineering, University of Pennsylvania, June 30, 1946, declassified February 13, 1947, Office Tech. Services, publication on February 13, 1953, pages 1–1–27, 1–1–27A, 1–1–28 and 1–1–29.

"A Functional Description of the Edvac.," University of Pennsylvania, November 1, 1949; volume II, Figures 104–3–LC–3, 104–7L D–1, and 104–10 LD–6.